United States Patent [19]
Wenzel

[11] Patent Number: 5,700,315
[45] Date of Patent: Dec. 23, 1997

[54] ANTI-OUTGASSING INK COMPOSITION AND METHOD FOR USING THE SAME

[75] Inventor: Donald E. Wenzel, Albany, Oreg.

[73] Assignee: Hewlett-Packard Company, Palo Alto, Calif.

[21] Appl. No.: 608,922

[22] Filed: Feb. 29, 1996

[51] Int. Cl.$^6$ ................................................ C09D 11/00
[52] U.S. Cl. ................................. 106/31.58; 106/31.86
[58] Field of Search ........................ 106/20 R, 22 R, 106/31.58, 31.86

[56] References Cited

U.S. PATENT DOCUMENTS

| | | |
|---|---|---|
| 4,329,698 | 5/1982 | Smith . |
| 4,500,895 | 2/1985 | Buck et al. . |
| 4,509,062 | 4/1985 | Low et al. . |
| 4,749,291 | 6/1988 | Kobayashi et al. . |
| 4,771,295 | 9/1988 | Baker et al. . |
| 4,794,409 | 12/1988 | Cowger et al. . |
| 4,818,285 | 4/1989 | Causley et al. . |
| 4,929,969 | 5/1990 | Morris . |
| 4,963,189 | 10/1990 | Hindagolla . |
| 5,108,504 | 4/1992 | Johnson et al. . |
| 5,180,425 | 1/1993 | Matrick et al. . |
| 5,188,664 | 2/1993 | Adamic et al. . |
| 5,196,056 | 3/1993 | Prasad . |
| 5,320,668 | 6/1994 | Shields et al. ............ 106/20 R |
| 5,428,383 | 6/1995 | Shields et al. . |
| 5,488,402 | 1/1996 | Shields et al. . |

FOREIGN PATENT DOCUMENTS 586079   7/1993   European Pat. Off. .

OTHER PUBLICATIONS

Hewlett–Packard Journal vol. 39, No. 4 (Aug. 1988), pp. 2–88.
Gjaldbaek, J.C. et al., "The Solubitity of Nitrogen, Argon and Ethane in Alcohols and Water", *Acta Chemica Scandinavica*, 12(5):1015–1023 (1958) (no month available).
Lannung, A., "The Solubilities of Helium, Neon and Argon in Water and Some Organic Solvents", *J. Am. Chem. Soc.*, 52:68–80 (1930) (no month available).

Primary Examiner—Deborah Jones
Assistant Examiner—Amy M. Harding

[57] ABSTRACT

An anti-outgassing ink composition and method for using the same. The ink composition consists of an ink vehicle, a coloring agent, and an anti-outgassing additive. The additive prevents the outgassing of dissolved gases from the ink composition (e.g. in the form of gas bubbles) at temperatures generated within thermal printers (about 25°–80° C.). The additive accomplishes this goal by increasing the solubility of the gas in the ink composition. As a result, the continuous and uninterrupted flow of ink from the ink delivery system is achieved. A preferred additive consists of ethoxylated glycerol. The additive is used in an amount sufficient to control bubble formation. A typical ink composition will contain about 2–12% by weight additive. Use of the ink composition provides numerous benefits which are achieved without physical modifications to the printing hardware.

1 Claim, 1 Drawing Sheet

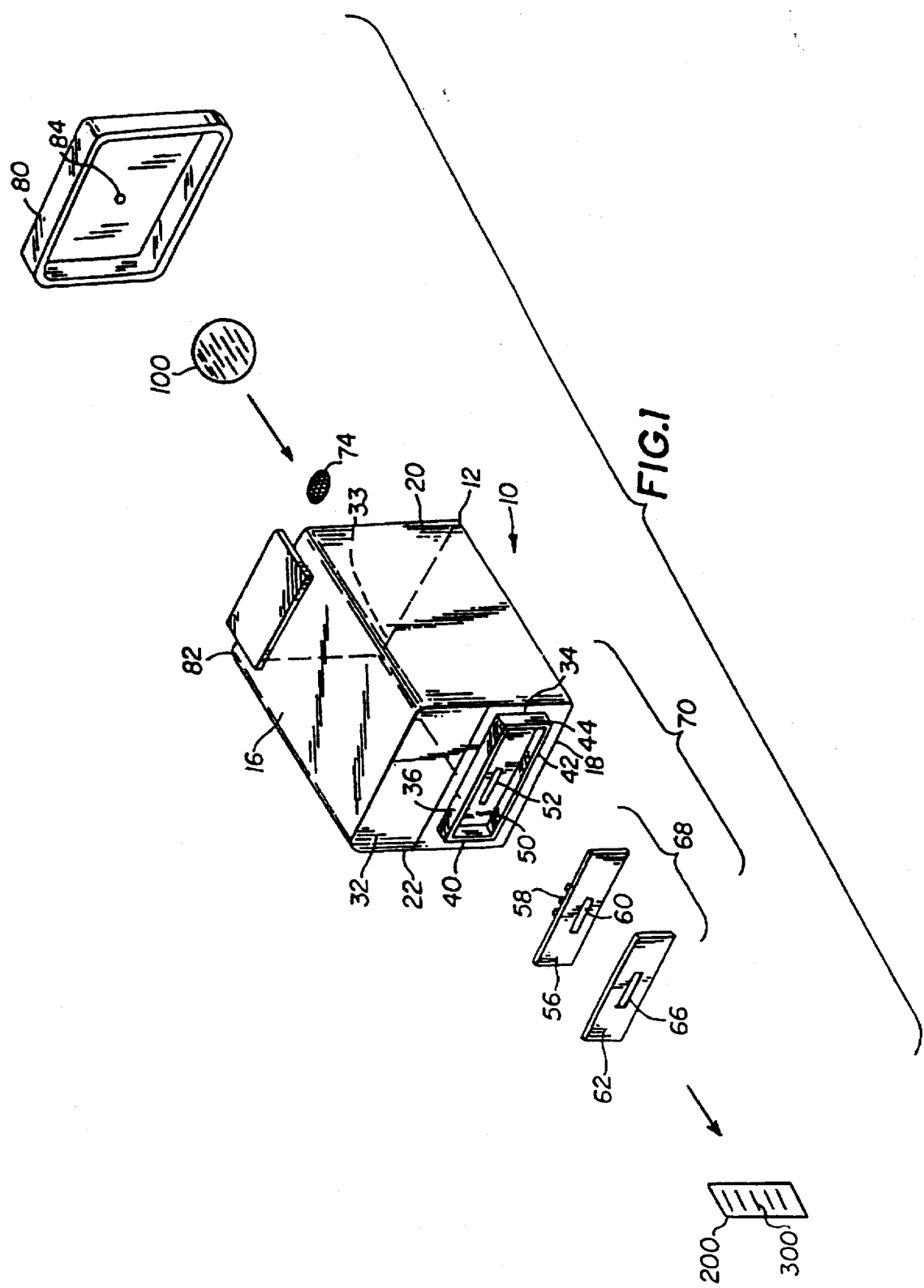

ANTI-OUTGASSING INK COMPOSITION AND METHOD FOR USING THE SAME

BACKGROUND OF THE INVENTION

The present invention generally relates to ink printing technology, and more particularly to an ink composition which is formulated to avoid outgassing (e.g. internal gas bubble generation) during delivery by thermal printing systems.

Substantial developments have been made in the field of electronic printing technology. A wide variety of highly efficient printing systems currently exist which are capable of dispensing ink in a rapid and accurate manner. Thermal inkjet systems are especially important in this regard. Printing systems using thermal inkjet technology basically involve a cartridge unit which includes at least one ink reservoir chamber in fluid communication with a substrate having a plurality of resistors thereon. Selective activation of the resistors causes thermal excitation of the ink and expulsion from the ink cartridge. The ink composition is specifically expelled through one or more tiny openings in a metallic member known as an "orifice plate".

Thermal inkjet cartridges may contain either a single ink composition (e.g. black) or a plurality of different colored ink materials each stored within a separate compartment or chamber. Representative thermal inkjet systems are discussed in U.S. Pat. No. 4,500,895 to Buck et al., No. 4,794,409 to Cowger et al.; No. 4,509,062 to Low et al.; No. 4,929,969 to Morris; No. 4,771,295 to Baker et al.; and the *Hewlett-Packard Journal*, Vol. 39, No. 4 (August 1988), all of which are incorporated herein by reference.

To obtain a high level of print quality using a thermal inkjet system or other printing apparatus, the ink composition must be carefully formulated. Likewise, reliability of the ink cartridge during operation is of primary consequence. The ink cartridge and ink composition within the cartridge should be designed so that the ink may be delivered without interruption over a sustained period of time. Many internal factors may cause the interruption of ink delivery during cartridge operation. For example, it is important to avoid the presence of extraneous solid materials within the ink which may block various components inside the cartridge unit, including the openings in the orifice plate. Careful processing and strict quality controls during the ink manufacturing process will control this problem. It is also necessary to prevent the growth of microorganisms (e.g. bacteria) within the ink composition. The presence of microorganisms can adversely affect print quality and ink cartridge operation. A number of anti-microbial agents may be used to avoid microorganism-related problems.

However, one problem of particular concern in thermal printing systems (e.g. thermal inkjet printers) is a condition known as "outgassing". The term "outgassing" basically involves the formation of gas bubbles directly within the ink composition during temperature increases which are normally encountered in thermal printing systems. The gas bubbles are comprised of gaseous materials which were previously dissolved in the ink compositions as discussed below. Typically, ink materials which are delivered using thermal inkjet technology are heated to an average temperature of about 25°–80° C., depending on the printing system being used. At temperatures within this range, the solubility of any air or other gases dissolved within the ink composition will decrease substantially. This condition (which is especially true in connection with water-based inks designed for plain-paper printing) causes supersaturation of the ink composition with the dissolved gases. In turn, the equilibrium kinetics associated with supersaturation will cause gas bubbles to form in the ink.

Many factors will determine whether dissolved gases are present within a particular ink composition, as well as the level of gas saturation in the ink. The initial dissolution of air or other gases (e.g. $CO_2$, He, Ne, Ar, $N_2$, $O_2$) within ink compositions typically occurs during the ink manufacturing process and is difficult to avoid. Gases may become dissolved in a particular ink composition due to agitation of the ink, chemical interactions between ink components which generate various gaseous by-products, air diffusion through specific components of the printing system (e.g. plastic cartridge housings, ink nozzles, etc.), and other factors. However, when dissolved gases are present in an ink composition, tests have shown that the outgassing/bubble generation rate will typically double when the ink temperature is raised from about 50° C. to 65° C. Further general information involving the relationship between increased fluid temperatures and diminished gas solubility is discussed in Gjaldbaek, J. C., et al., "The Solubility of Nitrogen, Argon and Ethane in Alcohols and Water", *Acta Chemica Scandinavica*, 12(5):1015–1023 (1958), and Lannung A., "The Solubilities of Helium, Neon and Argon in Water and Some Organic Solvents", *J. Am. Chem. Soc.*, 52:68–80 (1930) which are incorporated herein by reference. The correlation between temperature and the solubility of non-polar gases in non-polar liquids is expressed in accordance with the following general formula presented in Gjaldbaek et al.:

$$-\log x_2 = -\log x'_2 + 0.4343(V_2/RT)(\partial_1 - \partial_2)^2 + \log(V_2/V_1) + 0.4343(1 - [V_2/V_1])$$

[wherein: $x_2$=solubility in mole fraction;
$x^i_2$=the "ideal" solubility;
$V_1$=the molal volume of the solvent;
$V_2$=the partial molal volume of the dissolved gas;
$\partial_1$=the solubility parameter of the solvent;
$\partial_2$=the solubility parameter of the gas;
R=the gas constant; and
T=the absolute temperature.]

Gas bubble formation within an ink composition can impair ink delivery by the blockage of various internal components inside the ink cartridge. For example, gas bubbles may block ink flow through a variety of components including an internal conduit known as the "standpipe" and an ink filtration screen which is typically positioned adjacent the printhead inside the cartridge. In addition, gas bubbles can form within and block small channels inside a typical thermal inkjet cartridge unit which lead to the printing resistors. While temperature increases are the primary cause of outgassing, the degree of bubble formation may be influenced by other factors including (1) the level of agitation (e.g. mixing) experienced by the ink composition inside the ink cartridge unit during use; and (2) the number of "seed sites" or "nucleation areas" which are present in the cartridge. The terms "seed site" and "nucleation area" are substantially equivalent, and basically involve physical locations/structures where gases are likely to come out of solution. Multiple seed sites inside a cartridge unit can substantially increase the rate of bubble formation. Typical seed sites in a thermal inkjet cartridge will include the filtration screens described above, as well as silicon wafer structures present inside the cartridge unit and various filler materials (e.g. carbon and/or glass fibers) within plastic components used in the cartridge. Gas bubbles, themselves, may also function as seed sites for the formation of additional and/or larger bubbles in the ink. However, as previously indicated, temperature increases are the primary cause of decreased gas solubility and outgassing. In a typical ink composition of the type normally used in thermal inkjet printing systems, as much as about 2–10 cc of gas (mostly air) per liter of ink may be dissolved in the ink. The specific amount of gas to be released will depend on numerous factors including the temperature conditions encountered during ink delivery, the internal configuration of the ink cartridge unit, and other factors determined by experimental investigation. However, many ink compositions currently in use can release as much as about 1–5 cc of gas per liter of ink over a 1–5 hour period when subjected to temperatures between about 25°–80° C.

As discussed above, outgassing and bubble formation can cause numerous difficulties including the premature termination of ink delivery. A need currently exists for an ink composition which avoids problems caused by outgassing in thermal printing systems. The present invention satisfies this need in a highly efficient manner and represents a significant advance in the art of thermal inkjet technology as discussed below. Specifically, a unique ink composition and printing method are provided which prevent bubble formation in an effective manner without the need for physical modifications to the printing hardware.

SUMMARY OF THE INVENTION

It is an object of the present invention to provide an improved ink composition which is suitable for delivery using thermal printing systems with a high level of efficiency and reliability.

It is a further object of the invention to provide an improved ink composition which is specifically designed for delivery using thermal inkjet technology.

It is a further object of the invention to provide an improved ink composition which avoids problems caused by outgassing and bubble formation at temperature levels encountered in thermal printing systems.

It is a still further object of the invention to provide an improved ink composition which provides the foregoing benefits without any modifications to the printing hardware used for ink delivery.

It is a still further object of the invention to provide an improved ink composition which is capable of rapid, accurate, and consistent delivery using thermal inkjet cartridges of conventional design.

It is a still further object of the invention to provide an improved ink composition which produces clear and defined images while avoiding problems associated with interruptions caused by bubble formation.

It is an even further object of the invention to provide an improved ink composition and production method in which the foregoing benefits are achieved by the use of an anti-outgassing additive (e.g. ethoxylated glycerol in a preferred embodiment) in an mount sufficient to increase the solubility of any dissolved gases so that bubble formation is avoided.

It is an even further object of the invention to provide an improved method for generating printed images using the claimed ink composition which is characterized by a high level of quality, consistency, and a lack of interruptions in ink delivery.

In accordance with the foregoing objects, the present invention involves a specialized ink composition which is particularly designed for use in thermal printing systems (e.g. thermal inkjet printers). The claimed ink composition specifically avoids outgassing (e.g. bubble generation) when subjected to temperatures normally encountered in thermal printing systems (e.g. temperatures of about 25°–80° C.). The ink compositions discussed herein will contain at least some gaseous materials dissolved therein (especially air). Gas dissolution may take place during or after production as discussed above. At the temperature levels associated with thermal printing systems, these dissolved gases will experience a reduction in solubility. As a result, bubble formation will occur as the equilibrium characteristics of the ink change over time. Gas bubbles in the ink composition can interrupt the flow of ink through the internal components of the ink cartridge. Internal components susceptible to blockage in thermal inkjet cartridges include filtration screens and any conduits (e.g. standpipes) leading to the ink cartridge printhead.

To control these problems, an anti-outgassing ink composition is provided which comprises numerous components including an ink vehicle combined with at least one coloring agent. The ink composition will likewise include at least one dissolved gas therein as discussed above. The present invention shall not be limited to the use of any particular ink vehicles, coloring agents, or other ingredients (e.g. biocides, surfactants, and the like). More specific information regarding these items will be provided below. However, in a preferred embodiment, the ink composition will typically contain about 70–80% by weight ink vehicle and about 2–7% by weight coloring agent. The ink composition will likewise typically include about 2–10 cc of dissolved gas per liter of ink. Most of the dissolved gas (e.g. at least about 90% by weight of the total dissolved gas) will be air, although other gases may be present in varying amounts (e.g. He, Ne, Ar, $N_2$, $O_2$, $CO_2$).

To control problems caused by outgassing and bubble formation, the present invention involves a method and composition which causes the dissolved gas to experience an increase in solubility within the ink composition. To accomplish this goal, an anti-outgassing additive is added to the ink composition which causes the dissolved gas to experience an increase in solubility as discussed above. The additive prevents the dissolved gas from outgassing and forming gas bubbles in the ink composition when the ink is heated to a temperature of about 25°–80° C. in the printing apparatus. As noted above, this range is typical of the temperatures encountered in thermal-type printing systems (e.g. thermal inkjet printers). Accordingly, the essence of the claimed invention involves (1) combining an ink vehicle with at least one coloring agent to form an ink composition which includes at least one gas dissolved therein; and (2) causing the gas to experience an increase in solubility within the ink composition in order to prevent the gas from outgassing and forming bubbles in the ink composition when it is heated to a temperature of about 25°–80° C. in the printing system.

The amount of anti-outgassing additive to be used in the ink composition will depend on many factors which may be determined by preliminary pilot studies on the ink materials and printing systems under consideration. Important items to consider in determining the appropriate amount of anti-outgassing additive will involve an assessment of the temperature levels to be encountered, the other ingredients in the ink composition (e.g. the type of coloring agent), the internal configuration of the ink delivery cartridge, and other factors. In this regard, preliminary pilot testing will be employed to determine the precise amount of anti-outgassing additive to be used in a given situation. This testing will typically involve (1) combining at least one dye composition with an ink vehicle to form a desired experimental ink composition; (2) heating the ink composition to a temperature which would normally be encountered in a thermal printing system (e.g. between about 25°–80° C.); (3) analyzing the ink composition for the presence of gas bubbles; and (4) adding an amount of the selected anti-outgassing additive sufficient to avoid outgassing (bubble formation) at the temperature of concern. Tests may be conducted using laboratory-type equipment or direct placement of the ink within a thermal printing cartridge. Analysis of the ink for bubble formation can be accomplished by the direct visual observation of bubbles within the ink or the collection and quantification of released gas in a laboratory vessel. Likewise, if direct testing is undertaken in an ink cartridge unit, the premature termination of ink delivery provides an indication that bubbles have formed inside the cartridge.

While the present invention shall not be limited to any particular amount of anti-outgassing additive, a representative ink composition suitable for most purposes will include about 2–12% by weight anti-outgassing additive. A preferred additive suitable for this purpose is an ethylene oxide adduct of glycerine which is otherwise known as "ethoxylated glycerol". Further information on this composition, its structure, and commercial availability will be presented below in the "Detailed Description" section. This material provides outgassing control at the concentration and temperature levels described above (e.g. at a concentration of about 2–12% in accordance with printing temperatures of about 25°–80° C.) Other anti-outgassing additives which may also be used include but are not limited to the following chemical compositions: 2-pyrrolidone, diethylene glycol, N-methyl pyrrolidone, ethylene glycol, 2-propanol, 1-propanol, cyclohexanol and glycerol. All of the materials listed above will, in most cases, also have beneficial solvent characteristics which provide further benefits in the claimed ink composition (e.g. improved homogeneity and flow characteristics). In this regard, they can also function in part as the ink vehicle as discussed below. However, the essence of this invention involves the use of these materials in an amount sufficient to control outgassing beyond that which is necessary for use simply as a solvent (e.g. in amounts sufficient to control outgassing above the normal amounts used as a solvent or as a separate additive in addition to other, chemically different solvents). For this reason, even though the claimed compositions may have solvent/vehicle capabilities, the key inventive concept in the present invention involves the use of the claimed additives in a unique manner distinctive from solvent usage, namely, as outgassing control agents.

To generate printed images in an uninterrupted and continuous manner using the claimed ink composition, the ink is optimally delivered using a thermal printing system, namely, a thermal inkjet printer. While the present invention shall not be limited to any particular priming system for this purpose, a representative thermal inkjet cartridge suitable for delivery of the ink composition will include a housing having at least one ink retaining chamber therein and a printhead in fluid communication with the chamber. The printhead will include a plurality of resistors and an outer plate having at least one ink ejection opening through the plate. To generate a printed image, the ink retaining chamber in the cartridge is supplied with the anti-outgassing ink composition described above (e.g. comprising an ink vehicle, at least one dye composition, at least one gas dissolved therein, and an anti-outgassing additive/solvent comprised of ethoxylated glycerol or other comparable material). As previously discussed, the anti-outgassing additive will be present in an amount sufficient to cause the dissolved gas to experience an increase in solubility within the ink composition. Increased solubility of the dissolved gas in the ink composition will prevent the gas from outgassing and forming gas bubbles when the ink is heated to a temperature of about 25°–80° C. in the ink cartridge. An exemplary ink composition will again contain about 2–12% by weight of the desired anti-outgassing additive (preferably ethoxylated glycerol). If the selected anti-outgassing chemical is already being used as a solvent in the ink vehicle system, the 2–12% range will be over and above the amount used as a solvent.

The ink composition is delivered by activating the ink cartridge (e.g. energizing the resistors to heat the ink) so that the ink is expelled from the ink retaining chamber and applied to a desired substrate. The present invention shall not be limited to any particular substrates which may include paper, plastic, metal, or fabric. During cartridge activation, the ink composition will typically be heated to a temperature of about 25°–80° C. However, in accordance with a series of complex physical interactions, the anti-outgassing additive will prevent outgassing and bubble generation in the ink composition. In this manner, consistent and uninterrupted ink delivery from the cartridge to the substrate may be achieved.

The present invention represents an advance in the art of ink printing technology. The foregoing benefits (including improved cartridge reliability) are achieved in a highly efficient manner without physical modifications to printing system. These and other objects, features, and advantages of the invention will be described below in the following Brief Description of the Drawings and Detailed Description of Preferred Embodiments.

BRIEF DESCRIPTION OF THE DRAWINGS

FIG. 1 is a schematic representation of an exemplary thermal inkjet cartridge unit which may be used to deliver the claimed ink composition to a desired substrate.

DETAILED DESCRIPTION OF PREFERRED EMBODIMENTS

The present invention involves an ink composition which is characterized by the absence of "outgassing" (e.g. bubble formation) within the ink at temperatures normally encountered in thermal printing processes. In this regard, the ink composition and related printing methods provide many benefits, including improved printing efficiency in a manner which avoids interruptions in ink delivery.

Many factors will determine whether dissolved gases will be present within a particular ink composition, as well as the level of gas saturation in the ink. The initial dissolution of air or other gases (e.g. $O_2$, He, Ne, Ar, $CO_2$, $N_2$) within ink compositions typically occurs during the ink manufacturing process and is difficult to avoid. Gases may become dissolved in a particular ink composition due to agitation of the composition, chemical interactions between ink components which generate various gaseous by-products, air diffusion through specific components of the printing system (e.g. plastic cartridge housings, ink nozzles, etc.), and other factors. For example, in a typical ink composition of the type described herein, the composition may contain about 2–10 cc of dissolved gas per liter of ink composition, with this value being subject to substantial variation based on many factors including temperature conditions, the chemical compositions used in the ink, and other considerations. Normally, the most abundant dissolved gas within a given ink composition will consist of air as discussed below.

During thermal printing processes (especially thermal inkjet printing), the temperature of the ink composition will be heated to a level between about 25°–80° C. This temperature increase is a direct result of thermal excitation caused by the operating components in the printing apparatus. For example, in a thermal inkjet system, thermal excitation is caused by multiple resistors which are heated at desired intervals. When the ink composition is heated, the solubility of any air or other gases dissolved in the ink will decrease substantially (e.g. by about 25–50% in most cases). As a result, the ink composition will become supersaturated with the dissolved gases. The equilibrium kinetics associated with supersaturation will ultimately cause gas bubbles comprised of the previously-dissolved gas to form in the ink. Tests have shown that the rate of outgassing normally experienced in ink compositions of the type described herein will almost double when the ink temperature is raised from about 50° C. to 65° C. As noted above, further information on the relationship between increased fluid temperatures and diminished gas solubility is discussed in Gjaldbaek, J. C., et al., "The Solubility of Nitrogen, Argon and Ethane in Alcohols and Water", *Acta Chemica Scandinavica*, 12:1015–1023 (1958) and Lannung A., "The Solubilities of Helium, Neon and Argon in Water and Some Organic Solvents", *J. Am. Chem. Soc.*, 52:68–80 (1930) which are incorporated herein by reference. The correlation between temperature and non-polar gas solubility in non-polar liquids is expressed in the following general formula presented in Gjaldbaek et al.:

$$-\log x_2 = -\log x'_2 + 0.4343(V_2/RT)(\partial_1 \partial_2)^2 + \log(V_2/V_1) + 0.4343(1-[V_2/V_1])$$

[wherein: $x_2$=solubility in mole fraction;
$x'_2$=the "ideal" solubility;
$V_1$=the molal volume of the solvent;
$V_2$=the partial molal volume of the dissolved gas;
$\partial_1$=the solubility parameter of the solvent;
$\partial_2$=the solubility parameter of the gas;
R=the gas constant; and
T=the absolute temperature.]

As previously described, bubble formation within the ink composition can impair ink delivery by the blockage of various internal components inside the ink cartridge. For example, gas bubbles may interrupt ink flow through the standpipe, filter screens, and other components in the cartridge. In addition, gas bubbles can form within and block small channels inside a typical thermal inkjet cartridge unit which lead to the printing resistors.

While temperature increases are the primary cause of outgassing, the degree of bubble formation may be influenced by other factors including (1) the level of agitation (e.g. mixing) experienced by the ink composition inside the ink cartridge unit during use; and (2) the number of "seed sites" or "nucleation areas" which are present in the cartridge. The terms "seed site" and "nucleation area" are substantially equivalent and defined above. Multiple seed sites inside a cartridge unit can increase the rate of bubble formation because they allow more sites for supersaturated gases to come out of solution. Typical seed sites in a thermal inkjet cartridge will include the filtration screens described above, as well as silicon wafer structures present inside the cartridge unit and various filler materials (e.g. carbon and/or glass fibers) within plastic structures used in the cartridge. Gas bubbles, themselves, may also function as seed sites for the formation of additional and/or larger bubbles in the ink. However, temperature increases within the printing system remain the primary cause of decreased gas solubility and outgassing. The specific amount of gas dissolved within the ink composition and subsequently released will depend on numerous factors including the temperature conditions encountered during ink delivery, the internal configuration of the ink cartridge unit, and other factors determined by experimental investigation.

To avoid outgassing problems, the present invention involves an improved ink composition and production method which are designed to alter (e.g. increase) the solubility of dissolved gases within the ink so that bubbling/outgassing is avoided. As a result, the claimed ink composition provides many benefits as discussed above. While the invention shall be described herein with reference to thermal inkjet technology, the claimed ink composition and related processes are likewise applicable to numerous other thermal printing systems. Furthermore, the materials and procedures discussed below shall be applicable to single color (e.g. black) printing systems, as well as multi-color systems using a plurality of different coloring agents.

A. The Ink Composition

In accordance with the present invention, an ink composition is provided which is formulated to avoid outgassing and related conditions (e.g. bubble formation). The ink composition is especially suitable for delivery using thermal inkjet cartridges of the type disclosed in U.S. Pat. No. 4,500,895 to Buck et al.; No. 4,794,409 to Cowger et al.; No. 4,929,969 to Morris; and No. 4,771,295 to Baker et al., as well as those sold by the Hewlett-Packard Company of Palo Alto, Calif. (USA) [part nos. 51626A, 51608A, 51639A, 51639C, 51639M, 51639Y, and 51633A]. In addition, except as otherwise indicated below, the claimed invention shall not be limited to any particular ink ingredients (e.g. dyes, vehicles, and the like), with many different materials being suitable for use in the final ink product.

The ink composition will first include at least one coloring agent. Again, the present invention shall not be restricted to any particular coloring agents or mixtures thereof. In a preferred embodiment, the term "coloring agent" as used herein shall encompass a wide variety of different dye materials and colors (including black). Exemplary dye materials suitable for use in the ink composition are listed in U.S. Pat. No. 4,963,189 to Hindagolla which is incorporated herein by reference. Such materials are black and involve the following basic structure:

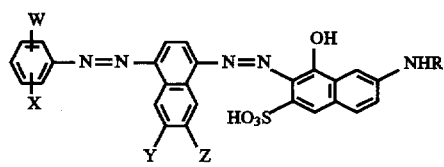

[W=—COOH
X=—H or —COOH
Y=—H, —COOH, or —SO$_3$H
Z=—H, —COOH, or —SO$_3$H
R=—H, —CH$_2$COOH, or —CH$_2$CH$_2$COOH]

Specific and exemplary dye structures are provided in Table I below:

TABLE I

| Dye # | X | W | Y | Z | R |
|---|---|---|---|---|---|
| 1 | 3-COOH | 5-COOH | H | H | H |
| 2 | 3-COOH | 5-COOH | COOH | H | H |
| 3 | 3-COOH | 5-COOH | H | COOH | H |
| 4 | 3-COOH | 5-COOH | H | $SO_3H$ | H |
| 5 | 3-COOH | 5-COOH | $SO_3H$ | H | H |
| 6 | H | 4-COOH | H | COOH | H |
| 7 | 3-COOH | 4-COOH | H | H | $CH_2COOH$ |
| 8 | 2-COOH | 5-COOH | H | $SO_3H$ | $CH_2COOH$ |
| 9 | 3-COOH | 5-COOH | $SO_3H$ | H | $CH_2COOH$ |
| 10 | 3-COOH | 5-COOH | H | H | $CH_2CH_2COOH$ |
| 11 | 3-COOH | 5-COOH | H | COOH | $CH_2COOH$ |

Additional dye materials suitable for use in the invention are described in the *Color Index*, Vol. 4, 3rd ed., published by The Society of Dyers and Colourists, Yorkshire, England (1971), which is incorporated herein by reference and is a standard text that is well known in the art. Exemplary dye materials listed in the *Color Index*, supra, that are suitable for use herein include but are not limited to the following compositions: C.I. Direct Yellow 11, C.I. Direct Yellow 86, C.I. Direct Yellow 132, C.I. Direct Yellow 142, C.I. Direct Red 9, C.I. Direct Red 24, C.I. Direct Red 227, C.I. Direct Red 239, C.I. Direct Blue 9, C.I. Direct Blue 86, C.I. Direct Blue 189, C.I. Direct Blue 199, C.I. Direct Black 19, C.I. Direct Black 22, C.I. Direct Black 51, C.I. Direct Black 163, C.I. Direct Black 169, C.I. Acid Yellow 3, C.I. Acid Yellow 17, C.I. Acid Yellow 23, C.I. Acid Yellow 73, C.I. Acid Red 18, C.I. Acid Red 33, C.I. Acid Red 52, C.I. Acid Red 289, C.I. Acid Blue 9, C.I. Acid Blue 61:1, C.I. Acid Blue 72, C.I. Acid Black 1, C.I. Acid Black 2, C.I. Acid Black 194, C.I. Reactive Yellow 58, C.I. Reactive Yellow 162, C.I. Reactive Yellow 163, C.I. Reactive Red 21, C.I. Reactive Red 159, C.I. Reactive Red 180, C.I. Reactive Blue 79, C.I. Reactive Blue 216, C.I. Reactive Blue 227, C.I. Reactive Black 5, C.I. Reactive Black 31, C.I. Basic Yellow 13, C.I. Basic Yellow 60, C.I. Basic Yellow 82, C.I. Basic Blue 124, C.I. Basic Blue 140, C.I. Basic Blue 154, C.I. Basic Red 14, C.I. Basic Red 46, C.I. Basic Red 51, C.I. Basic Black 11, and mixtures thereof. These materials are known in the art and commercially available from a variety of sources. Exemplary sources for dye materials of the type described above which may be used in the present invention include but are not limited to the Sandoz Corporation of East Hanover, N.J. (USA), Ciba-Geigy of Ardsley, N.Y. (USA) and others.

It should also be noted that the term "coloring agent" as used herein shall further encompass pigment dispersion materials known in the art which basically involve a water insoluble colorant (e.g. a pigment) which is rendered soluble through association with a dispersant (e.g. an acrylic dispersant).

Specific pigments which may be used to produce pigment dispersion materials are known in the art, and the present invention shall not be limited to any particular chemical compositions in this regard. Examples of such pigments include the following compositions which are listed in the *Color Index*, supra: C.I. Pigment Black 7, C.I. Pigment Blue 15, and C.I. Pigment Red 2. As noted above, dispersant materials suitable for combination with the foregoing pigments will include acrylic monomers and polymers known in the art. An exemplary commercial dispersant involves a product sold by W. R. Grace and Co. of Lexington, Mass. (USA) under the trademark DAXAD 30-30. However, as previously indicated, the claimed invention shall not be limited to the dyes and/or pigment dispersion materials listed above. Other chemically comparable materials may be used which are determined by reasonable investigation to be suitable for the purposes set forth herein. In a preferred embodiment, the ink composition of the present invention will include about 2–7% by weight total coloring agent therein (e.g. whether a single coloring agent or combined coloring agents are used).

The ink composition will also include an ink "vehicle" which is essentially used as a carrier medium for the other components in the ink composition. Many different materials may be used as the ink vehicle, with the present invention not being limited to any particular compositions for this purpose. A preferred ink vehicle will consist of water, although other supplemental compositions in combination with the water may be employed. These compositions include but are not limited to 2-pyrrolidone, ethoxylated glycerol, diethylene glycol, 1,5-pentanediol, N-methyl pyrrolidone, 2-propanol, and 2-ethyl-2-hydroxymethyl-1, 3-propanediol. All of these materials may be used in various combinations as determined by preliminary pilot studies on the ink compositions of concern. However, in a preferred embodiment, the ink composition will include about 70–80% by weight total combined ink vehicle, wherein at least about 30% by weight of the total ink vehicle will consist of water (with the balance comprising any one of the above-listed supplemental compositions). An exemplary ink vehicle will specifically contain about 60–80% by weight water and about 10–30% by weight of any one of the above-listed supplemental compositions.

The ink composition will also include a certain amount of dissolved gas therein which will necessitate the use of a selected anti-outgassing additive in the composition as discussed below. Many factors will determine whether dissolved gases will be present within a particular ink composition, as well as the level of gas saturation in the ink. As noted above, the initial dissolution of air or other gases within ink compositions typically occurs during the ink manufacturing process and is difficult to avoid. Gases may become dissolved in a particular ink composition due to agitation of the composition, chemical interactions between ink components which generate various gaseous by-products, and other factors. In the present case, the ink composition of interest will typically include about 2–10 cc of total (combined) dissolved gas per liter of ink, although this value may vary in view of many factors including the chemical components in the ink and other factors. Most of the dissolved gas (e.g. at least about 90% by weight of the total dissolved gas) will be air, although other gases may be present in varying amounts as discussed above (e.g. $CO_2$, $N_2$, Ar, He, Ne, and $O_2$).

Next, the ink composition may include a number of optional ingredients in varying amounts. For example, an optional biocide may be added to prevent any microbial growth in the final ink composition. Exemplary biocides suitable for this purpose would include proprietary products sold under the trademarks PROXEL GXL by Imperial Chemical Industries of Manchester, England; UCARCID 250 by Union Carbide of Danbury, Conn. (USA); and NUOSEPT 95 by Huls America, Inc. of Piscataway, N.J. (USA). In a preferred embodiment, if a biocide is used, the final ink composition will include about 0.05–0.5% by weight biocide, with about 0.30% by weight being preferred.

Another optional ingredient to be used in the ink composition will involve one or more buffering agents. The use of a selected buffering agent or multiple (combined) buffering agents is designed to stabilize the pH of the ink composition. In a preferred embodiment, the desired pH of the ink composition will range from about 4–9. Exemplary buffering agents suitable for this purpose will include sodium borate, boric acid, and phosphate buffering materials known in the art for pH control. The selection of any particular buffering agents and the amount of buffering agents to be used (as well as the decision to use buffering agents in general) will be determined in accordance with preliminary pilot studies on the particular ink composition of concern.

A still further optional ingredient which may be used in the ink composition is an auxiliary bleed control agent. This material is especially appropriate for use in multi-color printing systems. Exemplary bleed control agents suitable for this purpose will involve magnesium nitrate, calcium nitrate, or mixtures of both. In a preferred embodiment, the ink composition will include about 3–6% by weight total auxiliary bleed control agent therein. However, the selection of any given bleed control agent, the exact amount of bleed control agent to be used, and the general need for a bleed control agent may be determined in accordance with preliminary investigations involving the other components chosen for use in the ink composition. Additional ingredients (e.g. surfactants) may also be present in the ink composition if needed in accordance with the intended use of the ink.

Finally, in addition to the components listed above, a key ingredient in the claimed ink composition involves a selected anti-outgassing additive. The use of this material in the claimed ink composition provides numerous benefits which primarily relate to the control of bubble formation in the ink composition at temperature levels associated with thermal printing. While the present invention shall not be exclusively limited to any single additive for this purpose. A preferred anti-outgassing additive will involve a 26 mole ethylene oxide adduct of glycerine designated herein as "ethoxylated glycerol". This material is commercially available from Lipo Chemicals, Inc. of Paterson, N.J. under the name "LIPONIC EG-1" and has the following basic structure:

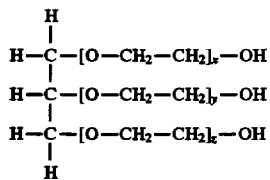

[wherein x+y+z=26]

Further general information regarding ethoxylated glycerol is discussed in U.S. Pat. No. 5,180,425. Ethoxylated glycerol as described above has a high level of stability at varying pH levels and likewise has a lubricant-like, dispersant character. At 25° C., it consists of a substantially colorless (or pale yellow) fluid with virtually no detectible odor. It is particularly soluble in water, alcohols, and other organic compositions. Likewise, it has the following additional chemical characteristics: (1) acid value=0.5 max.; (2) hydroxyl value=128–138; and (3) moisture=1% max. Regarding the anti-outgassing capabilities of this material (and the other additives listed below) the physical mechanisms which increase the solubility of dissolved gases within the ink composition are not entirely understood at the present time.

As described above, ethoxylated glycerol is especially effective in controlling outgassing and bubble formation in the claimed ink composition. However, other materials may also be employed as anti-outgassing additives. Additional anti-outgassing additives suitable for use in the present invention will include 2-pyrrolidone, diethylene glycol, N-methyl pyrrolidone, ethylene glycol, 2-propanol, 1-propanol, cyclohexanol, and glycerol.

All of the anti-outgassing materials listed above likewise have solvent capabilities in most cases which are especially important in producing properly formulated, homogeneous ink compositions. The solvent capabilities of some of these materials are briefly discussed in U.S. Pat. No. 5,428,383 and EPO App. No. 586,079 which are incorporated herein by reference. In this regard, the foregoing compositions can also function as an ink vehicle in combination with water. However, the essence of this invention involves the use of these materials in an amount sufficient to control outgassing beyond that which is necessary for use simply as a solvent (e.g. in amounts sufficient to control outgassing above the normal amounts used as a solvent or as a separate additive in addition to other, chemically different solvents). For this reason, even though the claimed compositions may have solvent/vehicle capabilities, the key inventive concept in the present invention involves the use of the claimed additives in a unique manner distinctive from solvent usage, namely, as outgassing control agents. It should also be noted that use of the claimed anti-outgassing additives in the amounts described herein can be expected to increase the solubility of any dissolved gases within the ink composition by about 10–60%, with ethoxylated glycerol producing results at or near the upper end of this range.

The goal of the anti-outgassing additive is to cause the dissolved gas to experience an increase in solubility so that bubble formation is prevented when the ink composition is heated to a temperature of about 25°–80° C. in the printing apparatus. As noted above, this range is typical of the temperatures encountered in thermal-type printing systems (e.g. thermal inkjet printers). The amount of anti-outgassing additive to be used in the claimed ink composition will vary depending on numerous factors including the temperatures encountered within the printing system, the other ingredients in the ink, the type of printing system being employed, and other considerations as determined by routine preliminary testing. This testing would typically involve (1) combining at least one dye composition with an ink vehicle to form a desired experimental ink composition; (2) heating the ink composition to a temperature which would normally be encountered in a thermal printing system (e.g. between about 25°–80° C.); (3) analyzing the ink composition for the presence of gas bubbles; and (4) adding an amount of the selected anti-outgassing additive sufficient to avoid outgassing (bubble formation) at the temperature of concern. Tests may be conducted using laboratory-type equipment or direct placement of the ink within a thermal printing cartridge. Analysis of the ink for bubble formation can be accomplished by the direct visual observation of bubbles within the ink or the collection and quantification of released gas in a laboratory vessel. Likewise, if direct testing is undertaken in an ink cartridge unit, the premature termination of ink delivery provides a preliminary indication that bubbles have formed inside the cartridge. In this regard, the present invention shall not be limited to any particular testing method, provided that the selected method allows a determination as to how much of the desired anti-outgassing agent will be appropriate in a given situation. Regarding the amount of anti-outgassing additive to be used, this value will vary in view of many factors including the type of printing system and temperatures under consideration, the other ingredients in the ink, and additional factors as determined by routine preliminary testing. However, an exemplary ink composition suitable for the purposes described herein will again contain about 2–12% by weight of the desired anti-outgassing additive (preferably ethoxylated glycerol). If the selected anti-outgassing additive is already being used as a solvent in the ink vehicle system, the 2–12% range will be over and above any of the amount already being employed as a solvent/vehicle. For example, if ethyoxylated glycerol is being used as the anti-outgassing additive in combination with different ink vehicles, then the ink composition will preferably contain about 2–12% by weight total ethoxylated glycerol. If ethoxylated glycerol is also being used as a vehicle/solvent, then the ink composition will contain about 2–12% by weight ethoxylated glycerol over and above the amount of this material being employed for vehicle/solvent purposes. Regarding the anti-outgassing agents listed above, the invention shall therefore cover: (1) the use of such materials in combination with different ink vehicles/solvents; or (2) the use of such materials for both purposes, with the extra quantity over the amount needed as a solvent being considered an anti-outgassing additive in accordance with the invention.

In summary, an exemplary ink composition suitable for use in the present invention is described below in Table II:

TABLE II

| Component | Wt. % |
| --- | --- |
| Anti-outgassing additive (ethoxylated glycerol) | 12 |
| Coloring Agent (C.I. Direct Black 52) | 6 |
| Ink Vehicle (water plus additional solvents) | 80 |
| Additional ingredients in combination (e.g. biocides, surfactants, bleed control agents, buffers etc.) | 2 |
| | 100.0 |

However, the present invention shall not be limited to the foregoing example, and may involve other ink compositions incorporating different ingredients in various combinations.

B. Delivery of the Ink Composition to Produce Printed Images

The claimed ink composition is especially suitable for use in printing systems which thermally excite the ink and deliver it to a selected substrate. While the present invention shall not be limited to the use of any particular printing technology, thermal inkjet systems are of primary interest. Thermal inkjet printers basically involve the use of a cartridge which includes at least one ink reservoir chamber in fluid communication with a substrate having a plurality of resistors thereon. Selective activation of the resistors causes thermal excitation of the ink and expulsion thereof from the ink cartridge. As noted above, representative thermal inkjet systems are discussed in U.S. Pat. No. 4,500,895 to Buck et al.; No. 4,794,409 to Cowger et al.; No. 4,509,062 to Low et al.; No. 4,929,969 to Morris; No. 4,771,295 to Baker et al., and the *Hewlett-Packard Journal*, Vol. 39, No. 4 (August 1988).

In accordance with a preferred method for producing a printed image using the claimed ink composition, an exemplary thermal inkjet cartridge 10 (which is broadly classified as a "thermal printing apparatus") is schematically illustrated in FIG. 1. With reference to FIG. 1, the cartridge 10 consists of a housing 12 preferably of unitary (e.g. single-piece) construction and manufactured from plastic. The housing 12 further includes a top wall 16, a bottom wall 18, a first side wall 20, and a second side wall 22. In the embodiment of FIG. 1, the top wall 16 and the bottom wall 18 are substantially parallel to each other and of the same size. Likewise, the first side wall 20 and the second side wall 22 are substantially parallel to each other and of the same size.

With continued reference to FIG. 1, the housing 12 further includes a front wall 32. Surrounded by the front wall 32, top wall 16, bottom wall 18, first side wall 20, and second side wall 22 is an interior ink retaining compartment or chamber 33 within the housing 12. The front wall 32 further includes an externally-positioned support structure 34 which is constructed of a plurality of outwardly-extending side sections 36, 40, 42, 44 with a substantially rectangular center zone 50 therebetween. Positioned within the center zone 50 and passing entirely through the front wall 32 of the housing 12 is an elongate ink outlet port 52 which communicates with the chamber 33 inside the housing 12.

Fixedly secured to the front wall 32 of the housing 12 (e.g. preferably using an adhesive composition known in the art) and positioned within the center zone 50 of the support structure 34 is a substrate in the form of a plate member 56 having a plurality of thin film resistors 58 thereon which are schematically illustrated and enlarged for the sake of clarity in FIG. 1. Likewise, the plate member 56 further includes at least one opening 60 therethrough which substantially registers and communicates with the ink outlet port 52 in the assembled cartridge 10. In addition, secured to the plate member 56 by adhesive, welding, or the like is an outer plate conventionally known as an "orifice plate" 62. The orifice plate 62 is preferably made of an inert metal composition (e.g. gold-plated nickel), and further includes at least one ink ejection orifice 66 therethrough. The ink ejection orifice 66 is arranged on the orifice plate 62 so that it substantially registers with the opening 60 through the plate member 56 in the assembled cartridge 10. For the purposes of this invention, plate member 56, thin film resistors 58, opening 60, orifice plate 62 and ink ejection orifice 66 shall collectively be characterized as "ink expulsion means" 68, the operation of which will be described below. Furthermore, as shown in FIG. 1, the ink expulsion means 68 in combination with the support structure 34 (e.g. including side sections 36, 40, 42, 44, center zone 50, and ink outlet port 52) shall collectively be characterized as the printhead 70 of the ink cartridge 10 which is fixedly secured to the cartridge 10.

As noted above, the claimed invention shall not be limited exclusively to the cartridge 10 shown in FIG. 1 or to thermal inkjet cartridges in general. For example, other cartridges/ink delivery systems may be encompassed within the present invention which involve printhead units having different ink expulsion means other than the thin film resistor assembly set forth above. Alternative ink expulsion means encompassed within the present invention shall include but not be limited to piezoelectric ink drop expulsion systems of the general type disclosed in U.S. Pat. No. 4,329,698 to Smith, dot matrix systems of the type disclosed in U.S. Pat. No. 4,749,291 to Kobayashi et al., as well as other systems which deliver ink from a self-contained reservoir/chamber. Thus, the present invention shall not be exclusively limited to use in connection with thermal inkjet systems as noted above.

With continued reference to FIG. 1, the ink cartridge 10 further includes an ink filter 74 which is mounted within the chamber 33 of the housing 12 as illustrated. Specifically, the ink filter 74 is mounted directly adjacent to and against the ink outlet port 52 in the front wall 32 of the housing 12. The ink filter 74 is preferably manufactured from stainless steel wire mesh. The ink filter 74 is particularly susceptible to full or partial blockage by gas bubble formation during outgassing in conventional ink compositions.

As schematically illustrated in FIG. 1, the ink cartridge 10 also has a cap member 80 which is adapted for affixation (e.g. using a conventional adhesive) to the open rear portion 82 of the housing 12. The cap member 80 likewise includes at least one air vent 84 which may be covered with a porous plastic membrane (not shown) as discussed in U.S. Pat. No. 4,771,295 to Baker et al. which allows air to pass therethrough while preventing ink leakage from the cartridge 10.

To deliver the ink composition to a selected substrate using the cartridge 10, the ink retaining chamber 33 of the cartridge 10 is supplied with the claimed ink composition (schematically designated at reference number 100 in FIG. 1) which includes at least one dye composition, a vehicle, any of the optional ingredients listed above, at least one dissolved gas, and an anti-outgassing additive in an amount sufficient to prevent outgassing and bubble generation at temperatures of about 25°–80° C. in the cartridge 10. As noted above, a preferred anti-outgassing additive suitable for this purpose is ethoxylated glycerol.

Thereafter, the ink cartridge is activated in order to apply the ink composition 100 from the chamber 33 to a selected substrate 200 (which may be constructed from paper, metal, plastic, or fabric). The term "activation" as used herein basically involves a process in which the ink expulsion means 68 is directed by the printer unit (not shown) to deliver ink from the chamber 33 to the substrate 200. This is accomplished by selectively energizing the thin film resistors 58 on the plate member 56 (FIG. 1). As a result, ink positioned at the opening 60 in the plate member 56 is thermally excited and expelled outwardly through the ink ejection orifice 66 in the orifice plate 62 onto the paper or other substrate 200. In this manner, the cartridge 10 may be used to print an image 300 on the substrate 200. Further information regarding the thermal inkjet printing process is again set forth in the *Hewlett-Packard Journal*, Vol. 39, No. 4 (August 1988). During this activation process, the ink composition 100 is typically heated to a temperature of about 25°–80° C. (depending on the type of printing system being used). However, use of the anti-outgassing additive described herein (e.g. ethoxylated glycerol) will control outgassing and the generation of bubbles in the ink composition 100 at the foregoing temperature levels. As a result, the consistent and uninterrupted delivery of the ink composition 100 from the ink cartridge 10 onto the substrate 200 is achieved.

The present invention offers numerous benefits as described above. Specifically, it allows the control of outgassing and bubble generation from ink compositions at temperatures normally encountered in thermal printing systems. This benefit is achieved without the need to physically modify the selected ink cartridge unit and other system hardware. In this manner, clear and distinct printed images can be generated without premature interruption/termination caused by outgassing within the printing system. Having herein described preferred embodiments of the invention, it is anticipated that suitable modifications may be made thereto by individuals skilled in the art which nonetheless remain within the scope of the invention. For example, the claimed invention shall not be limited to any particular coloring agents, vehicles, and supplemental ingredients in the ink composition. Accordingly, the present invention shall only be construed in connection with the following claims:

The invention that is claimed is:

1. A method for preventing outgassing in an ink composition which is used in a thermal printing apparatus, said method comprising the steps of:

combining an ink vehicle with at least one coloring agent to form an ink composition, wherein said ink composition comprises at least one gas dissolved therein; and adding to said ink composition an anti-outgassing additive which causes said gas to experience an increase in solubility within said ink composition in order to prevent said gas from outgassing and forming gas bubbles in said ink composition when said ink composition is heated to a temperature of about 25°–80° C. in said printing apparatus.

* * * * *